US011926072B2

(12) United States Patent
Stefani et al.

(10) Patent No.: US 11,926,072 B2
(45) Date of Patent: Mar. 12, 2024

(54) METHOD FOR DECORATING IN THICKNESS A CERAMIC SLAB

(71) Applicant: SYSTEM CERAMICS S.P.A., Modena (IT)

(72) Inventors: Franco Stefani, Sassuolo (IT); Franco Gozzi, Formigine (IT); Paolo Vaccari, Modena (IT)

(73) Assignee: SYSTEM CERAMICS S.P.A., Fiorano Modenese (IT)

( * ) Notice: Subject to any disclaimer, the term of this patent is extended or adjusted under 35 U.S.C. 154(b) by 253 days.

(21) Appl. No.: 17/296,389

(22) PCT Filed: Nov. 28, 2019

(86) PCT No.: PCT/IB2019/060275
§ 371 (c)(1),
(2) Date: May 24, 2021

(87) PCT Pub. No.: WO2020/121101
PCT Pub. Date: Jun. 18, 2020

(65) Prior Publication Data
US 2022/0024069 A1 Jan. 27, 2022

(30) Foreign Application Priority Data
Dec. 10, 2018 (IT) ........................ 102018000010922

(51) Int. Cl.
*B28B 5/02* (2006.01)
*B28B 13/02* (2006.01)

(52) U.S. Cl.
CPC ............ *B28B 5/027* (2013.01); *B28B 13/022* (2013.01)

(58) Field of Classification Search
CPC ....... B28B 5/027; B28B 13/022; B28B 1/005; B28B 13/0215; B28B 13/028;
(Continued)

(56) References Cited

U.S. PATENT DOCUMENTS 5,554,393 A 9/1996 Uchida et al.
5,736,084 A 4/1998 Uchida et al.
2018/0250846 A1 9/2018 Stefani

FOREIGN PATENT DOCUMENTS

CN 201436168 U * 4/2010
CN 201436168 U 4/2010
(Continued)

*Primary Examiner* — S. Behrooz Ghorishi
(74) *Attorney, Agent, or Firm* — Pearne & Gordon LLP; J. Gregory Chrisman

(57) ABSTRACT

A method for decorating in thickness a ceramic slab, comprising the following steps:
- preparing, on a decoration surface (10), a first soft decorated layer (L1) of ceramic material endowed with a decoration (V);
- progressively transferring, by deposition, the soft decorated layer (L1) from the decoration surface (10) to a first deposition surface (50), situated at a lower height than the decoration surface (10), thus progressively forming on the first deposition surface (50) a second soft decorated layer (L2) which has a head (H) and a tail (T);
- progressively transferring, by deposition, the second soft decorated layer (L2) from the first deposition surface (50) to a second deposition surface (83), situated at a lower height than the first deposition surface (50), starting from the tail (T) of the second soft decorated layer (L2), thus progressively forming on the second deposition surface (83) a third soft decorated layer (L3).

10 Claims, 9 Drawing Sheets

(58) Field of Classification Search
CPC ....... B28B 17/0081; B28B 3/123; B44F 9/04; B30B 15/302
See application file for complete search history.

(56) References Cited

FOREIGN PATENT DOCUMENTS

| | | | | |
|---|---|---|---|---|
| CN | 102303357 | A | * | 1/2012 |
| CN | 102303357 | A | | 1/2012 |
| CN | 103481358 | A | | 1/2014 |
| CN | 104708707 | A | | 6/2015 |
| EP | 1977872 | A2 | | 10/2008 |
| IT | 102018000007720 | | | 2/2020 |
| WO | 2017051275 | A1 | | 3/2017 |

* cited by examiner

METHOD FOR DECORATING IN THICKNESS A CERAMIC SLAB

FIELD OF THE INVENTION

The present invention relates to a method for decorating a thickness of a ceramic slab.

BACKGROUND OF THE INVENTION

In the production of ceramic tiles, there is frequently a need to produce decorations that reproduce natural stone or wood. As is well known, such materials have veins that extend throughout the entire mass. This means that, when they are processed into slabs, the veins extend from the outer surfaces through the whole thickness, and are thus also visible on the lateral surfaces of the slabs. The veining effect is particularly sought after for the production of kitchen counters or bathroom counters, steps, low walls or edges, in general for the production of finishes in which the lateral surfaces are visible throughout the whole thickness of the slabs.

BRIEF SUMMARY OF THE INVENTION

The applicant has developed a technology that enables the production of decorations, for example in the form of veins, which pass through the entire thickness of the slabs. Very briefly, this technology envisages applying or producing the decoration in the ceramic material prior to pressing.

The application or production of the decoration can substantially take place with two methods.

A first method envisages spreading a layer of soft ceramic material and, after it is spread, applying a decoration in liquid form, using, for example, an ink jet printer. The liquid decoration penetrates by diffusion or absorption throughout the whole thickness of the soft layer. After the decoration has been applied, the soft layer can be pressed and fired. Prior to pressing it is possible to transfer the soft layer from a first to a second mobile surface. The second mobile surface moves in the same direction as the first, preferably at a lower speed, so that the soft layer can be compacted and increase in thickness.

A second method envisages simultaneously spreading, by means of a special decorator device, a soft layer already provided with a decoration throughout its thickness made with soft material.

In both methods, the spreading of the decorated layer entails a motion from top to bottom and a relative motion, directed horizontally, between the decoration or the decorated layer and a deposition surface.

In the first case, the decoration in liquid form is applied from top to bottom on a soft layer, producing a relative motion between the source of the decoration and the soft layer. For example, the source of the decoration, i.e. the printer, is stationary, whilst the soft layer is in motion on a mobile surface.

In the second case, the already decorated soft layer is spread by the decorator device on an underlying deposition surface while a relative motion is produced. For example, the source of the decoration, i.e. the decorator device, is stationary, whilst the deposition surface is in motion.

In both cases, the relative motion between the source of the decoration and the deposition surface produces an inclination of the decoration on a vertical plane parallel to the direction of the relative motion. Essentially, when one observes the decorated ceramic slab on a lateral surface parallel to the direction of the relative motion, the veins are all inclined in the same manner, parallel to each other, in an unnatural manner.

The object of the present invention is to offer a method that allows the inclination of the decoration to be modified, making it possible, for example, to produce veins that extend on vertical planes in the thickness of the ceramic slab.

BRIEF DESCRIPTION OF THE DRAWINGS

Characteristics and advantages of the present invention will more fully emerge from the following detailed description of an embodiment of said invention, as illustrated in a non-limiting example in the accompanying drawings, in which.

DETAILED DESCRIPTION OF PREFERRED EMBODIMENTS

Figure 1:
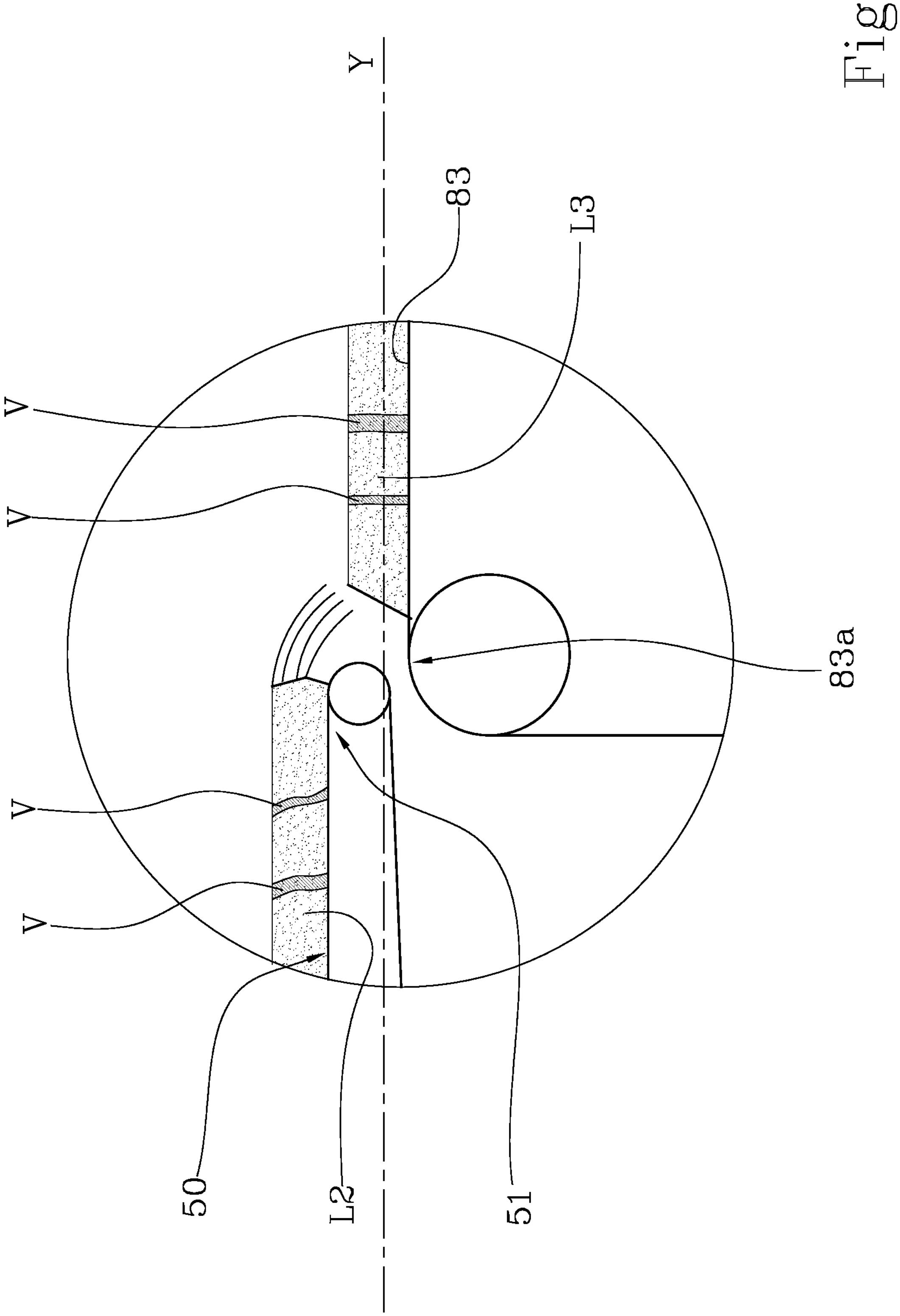
FIG. 1 shows a schematic view of one embodiment of the method according to the present invention, in the enlarged area "A" of FIGS. 2 and 4.

The method according to the present invention comprises preparing, on a decoration surface (10), a first soft decorated layer (L1) of ceramic material endowed with a decoration (V). The decoration (V) can be obtained in ways that will be described below.

The method subsequently envisages transferring the first layer (L1) from the decoration surface (10) to a first deposition surface (50), situated at a lower height than the first deposition surface (50). The transfer takes place by progressive deposition, as schematically illustrated in FIGS. 3*a*, 3*b* and 6*a*, 6*b*. Essentially, the progressive transfer brings about the deposition of the first layer (L1) on the first deposition surface (50), progressively forming a second layer (L2) which has a head (H) and a tail (T). The head (H) is formed by the material that is deposited first on the first deposition surface (50). The tail (T) is formed by the material that is deposited last on the first deposition surface (50).

In the illustrated embodiments, the decoration surface (10) is in the form of a flexible belt, mobile along a closed path that revolves around a pair of rollers (31,32). Along the path defined by the rollers (31,32), the decoration surface (10) has an upper portion (10*a*), along which it slides forward along the longitudinal direction (Y) and along which it is possible to spread the first layer (L1). In the portion that revolves around a front wheel (31), the first layer (L1) is progressively transferred downward onto the first deposition surface (50), thus forming the second layer (L2) starting from the head area (H) and ending with the tail area (T). In the solution represented, the first deposition surface (50) is mobile along the longitudinal direction (Y) in an opposite direction relative to the upper portion (10*a*) of the decoration surface. Other solutions would be possible, in which the motions of the decoration surface (10) and of the deposition surface (50) are in the same direction, or in which the deposition surface (50) is stationary and the decoration surface (10), besides sliding along the longitudinal direction (Y), is also mobile relative to the deposition surface (50) along the longitudinal direction (Y). By varying the relative speed between the decoration surface (10) and the first deposition surface (50), it is possible to modify the thickness of the layer (L2). Practically speaking, with a forward travel speed of the decoration surface (10) that is greater than the forward travel speed of the first deposition surface (50), the thickness of the layer (L2) will increase.

The method comprises subsequently transferring the second layer (L2) from the first deposition surface (50) to a second deposition surface (83), situated at a lower height than the first deposition surface (50). The second layer (L2) is transferred starting from the tail (T). In other words, the tail (T) of the second layer (L2) is deposited first on the second deposition surface (83).

The transfer of the second layer (L2) from the first deposition surface (50) to the second deposition surface (83) preferably takes place according to the solution described in the publication WO2017051275. According to that solution, the first deposition surface (50) is substantially aligned and contiguous, at a greater height, to the second deposition surface (83).

As may be seen in FIG. 1, the first deposition surface (50) comprises a front end (51) that defines a terminal portion at which the first deposition surface (50) defines a return curve. The front end (51) is at least partially above a rear end (83*a*) of the second deposition surface (83). When the first deposition surface (50) and the second deposition surface (83) are made to travel forward in synchrony, that is, in the same forward travel direction, the second decorated layer (L2) is transferred from the first deposition surface (50) to the second deposition surface (83), undergoing a modest drop downward at the front end (51) of the deposition surface (50) and progressively forming the third layer (L3). The deposition surface (50) and the mobile surface (83) are movable independently of each other, i.e. each of them is equipped with its own motor means that can be actuated independently of the others. By varying the speed of the two deposition surfaces (50,83) it is possible also to modify the thickness of the third layer (L3).

The transfer between the decoration surface (10) and the first deposition surface (50) produces a movement of the material along the longitudinal direction (Y) which is not equal along the thickness of the first layer (L1). Essentially, due to this relative motion, a vein of material which, in the transfer, should remain vertical on a vertical plane parallel to the longitudinal direction (Y), is instead inclined, from top to bottom, from the head (H) towards the tail (T).

The transfer of the second layer (L2) from the first surface (50) to the second decoration surface (83), which takes place starting from the tail (T), produces a movement of the material along the longitudinal direction (Y) opposite the previous one. This thus enables the inclination of the decoration (V) to be modified, by inverting it, as schematically illustrated in FIG. 1. In other words, the transfer of the second layer (L2) starting from the tail (T) enables the inclination of the decoration (V) to be modified or corrected, by producing an effect opposite to the cause that produced the inclination of the decoration (V).

The method according to the present invention can be implemented with a machine that comprises a decorator device (4,20,40). Said decorator device can take on some preferred embodiments that will be illustrated below with reference to FIGS. 2 and 4. The machine further comprises a first deposition surface (50), situated at a lower height than the decorator device (4,10,11). A second deposition surface (83) is situated at a lower height than the first deposition surface (50).

The machine comprises a first motor means, configured to provide a first relative motion, between the decoration surface (10) and the first deposition surface (50), directed along a longitudinal direction (Y). The machine further comprises a second motor means, configured to provide a second relative motion, between the first deposition surface (50) and the second deposition surface (83), directed along the longitudinal direction (Y). The first motor means and the second motor means can be activated independently of each other.

Figure 2:
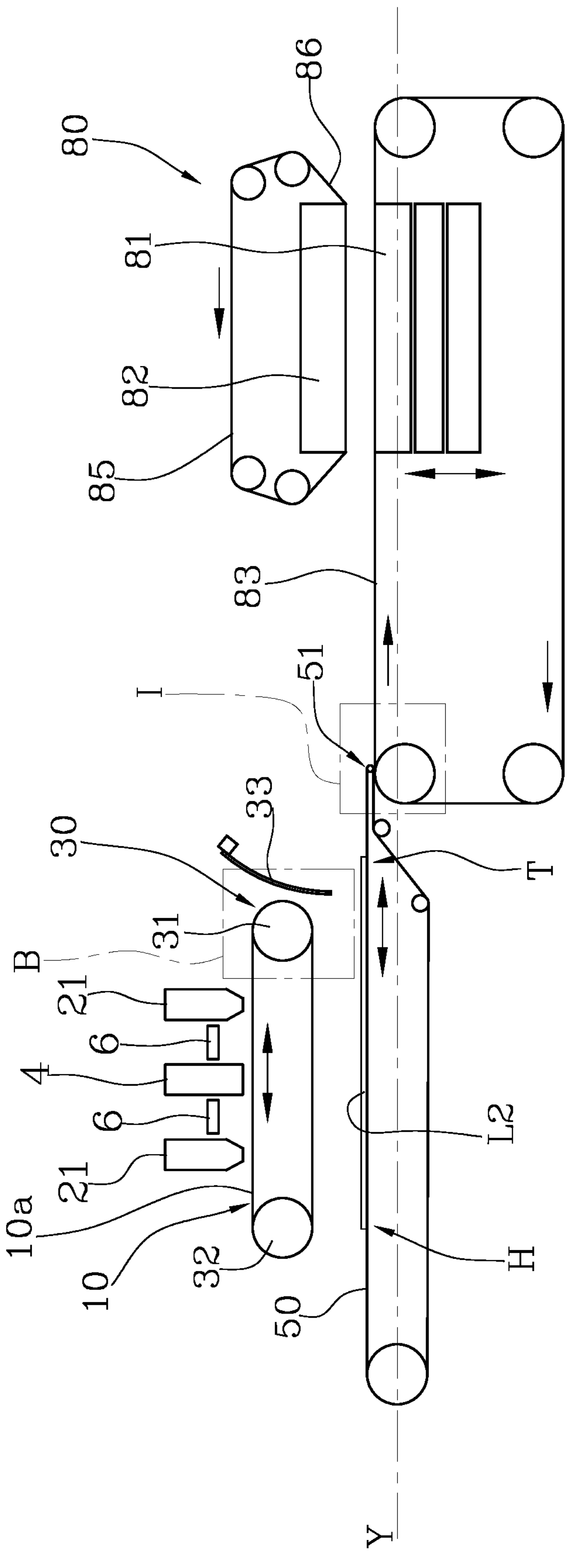
FIG. 2 shows a possible embodiment of a machine for implementing the method.

In a possible embodiment of the invention, schematically illustrated in FIG. 2, the preparation of the first decorated soft layer (L1) by means of the decorator device (4) takes place as described in patent application 102018000007720. The decorated soft layer (L1) is preferably obtained by spreading a layer of ceramic material in powder or granular form on the decoration surface (10) by means of a distributor device (21), of a type known to the person skilled in the art. A motor means is configured to provide a relative motion between the decoration surface (10) and the distributor device (21) along the longitudinal direction (Y). This enables the granular or powder material to be deposited in the form of a layer. The decoration surface (10) is preferably activated in movement along the longitudinal direction (Y), whereas the distributor (21) is static. It would be possible, however, to invert the motion of the two devices, or else move both at different speeds. Such possible solutions are not represented in detail, as they are known to the person skilled in the art.

The decoration (V) is preferably applied on the layer of ceramic material after the latter has been spread. The decoration (V) is produced with a liquid colouring agent, for example an ink with ceramic pigments or a ceramic enamel or a soluble-salt ceramic ink already widely known in the art of decoration of ceramic tiles. The liquid colouring agent, in fact, penetrates into and is spread through the thickness of the layer of ceramic material. The decoration (V) can be applied by means of a digitally controlled dispensing device (4). Preferably, but not necessarily, the dispensing device (4) is structured so as to enable the controlled deposition of punctiform drops of colouring agent, in controlled positions. For example, the dispensing device (4) is of the drop-on-demand type, such as an ink-jet or valve-jet printhead. All of the devices indicated are well known in the art and will thus not be described in further detail. The decoration (V) is spread through the thickness of the layer (L1) in such a way as to obtain a decoration or a through-body colour, i.e. a decoration or colouring that extends throughout the thickness of the layer (L1). The decoration (V)) is in fact in a liquid material that is able to spread inside the layer (L), since the latter has not undergone any pressing or compacting step, but is simply deposited on the first deposition surface (50).

Figure 4:
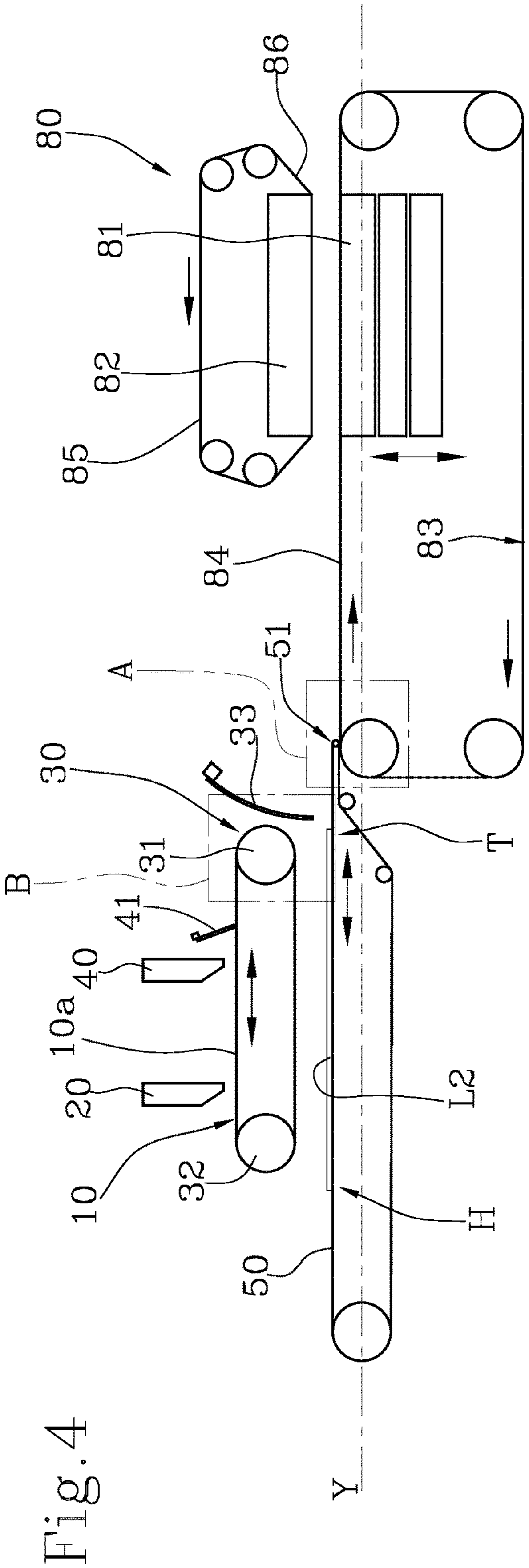
FIG. 4 shows a second possible embodiment of a machine for implementing the method.

In an alternative embodiment of the invention, illustrated in FIG. 4, the preparation of the decorated soft layer (L) can be carried out by means of a decorator device (20,40). In this embodiment, the decoration surface (10) comprises a plurality of cavities (11) with a pre-established shape and depth or height. Each of the cavities (11) has an opening that enables the entry of the powder material and a subsequent unloading of the powder material that was previously introduced. Each cavity (11) is delimited by a lateral wall and a bottom.

Figure 3A:
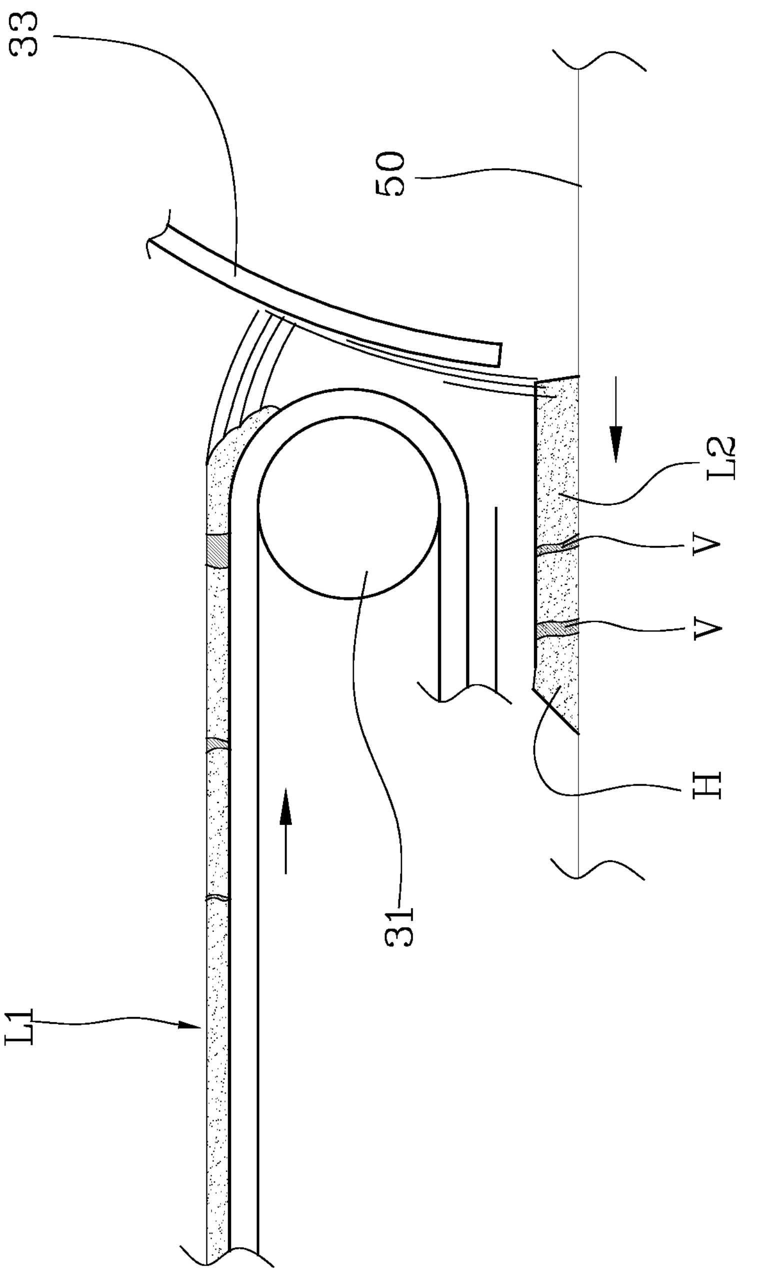
FIG. 3*a* shows the enlargement "B" of FIGS. 2 and 4.
Figure 3B:
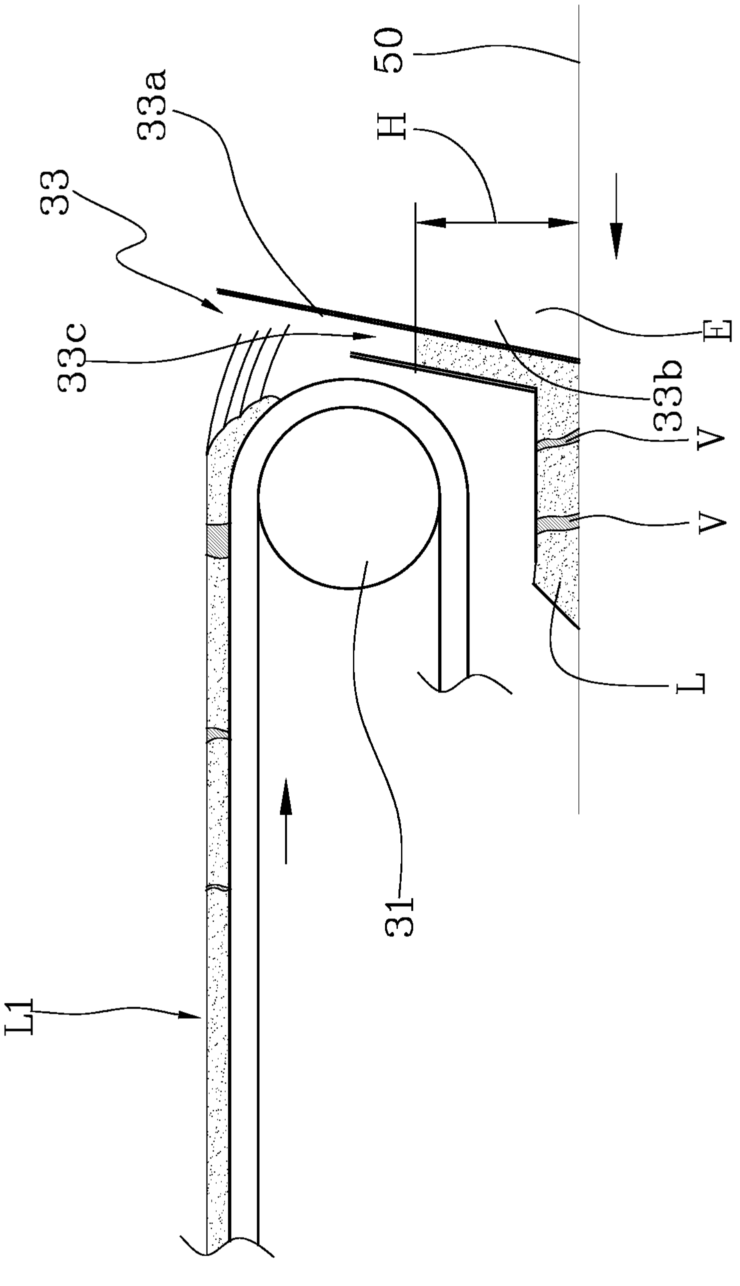
FIG. 3*b* shows an alternative embodiment of the detail "33" of FIG. 3*a;*
Figure 5B:
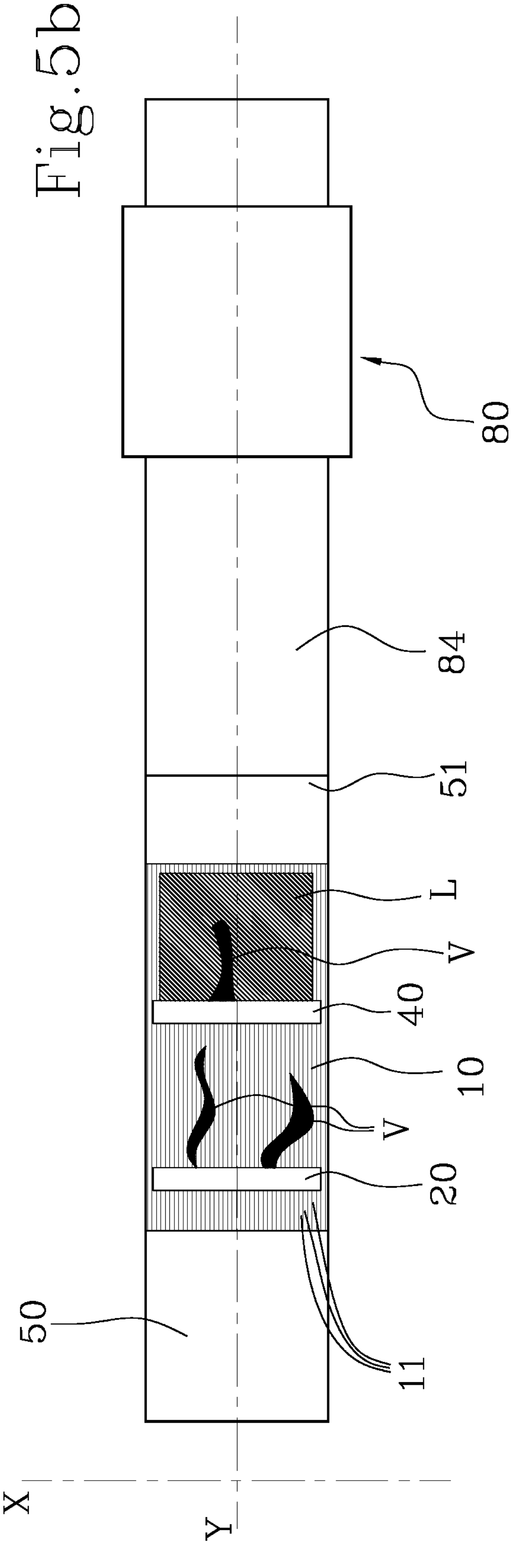
FIGS. 5*a* and 5*b* show two plan views of the machine of FIG. 4, in two possible embodiments.
Figure 5A:
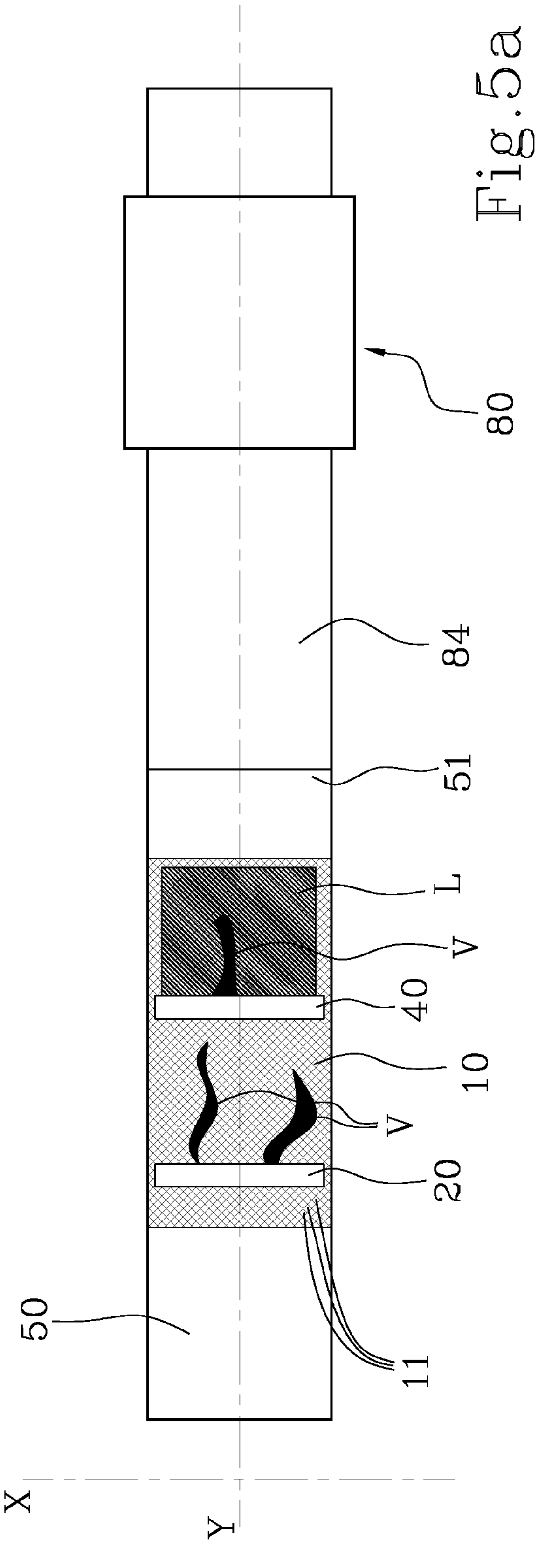
Figure 6A:
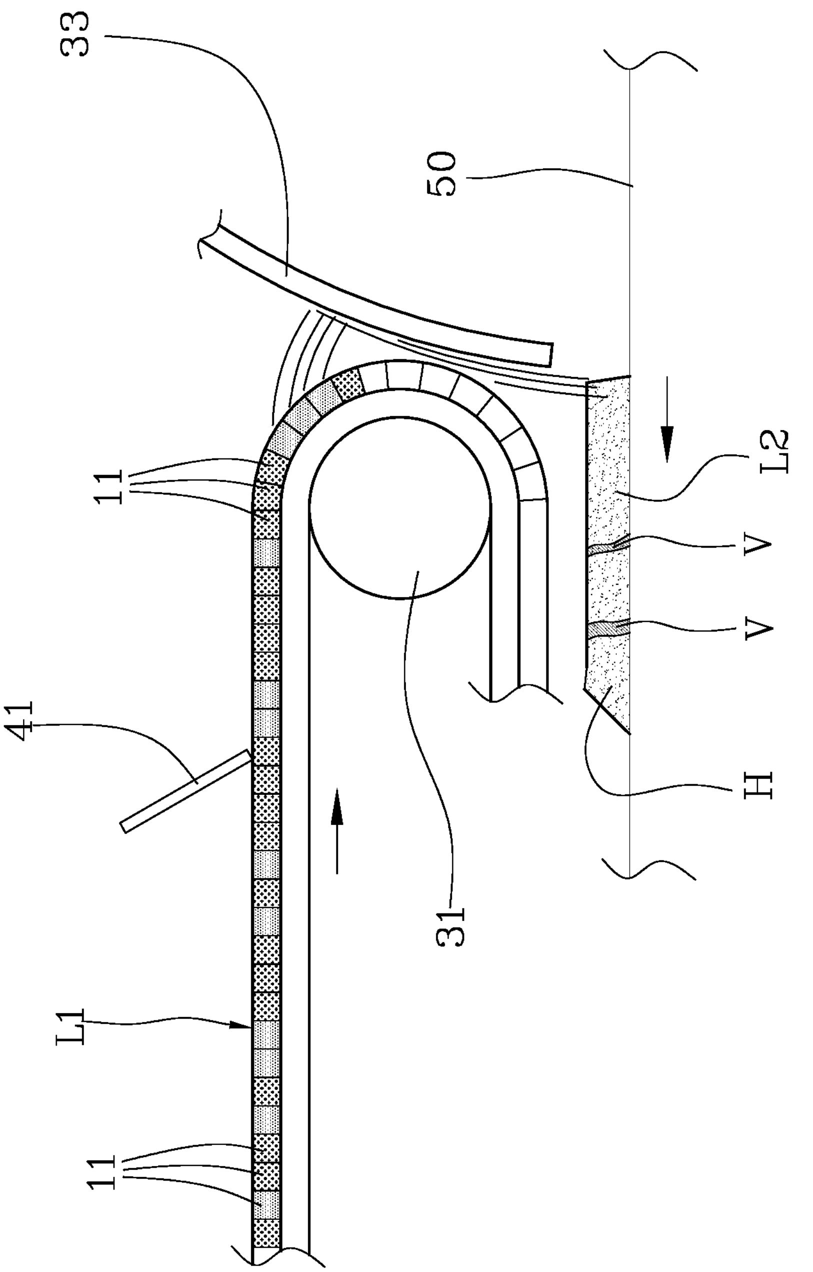
FIG. 6*a* shows the enlargement "B" of FIG. 3, in the embodiment of the machine of FIG. 5*a;*
Figure 6B:
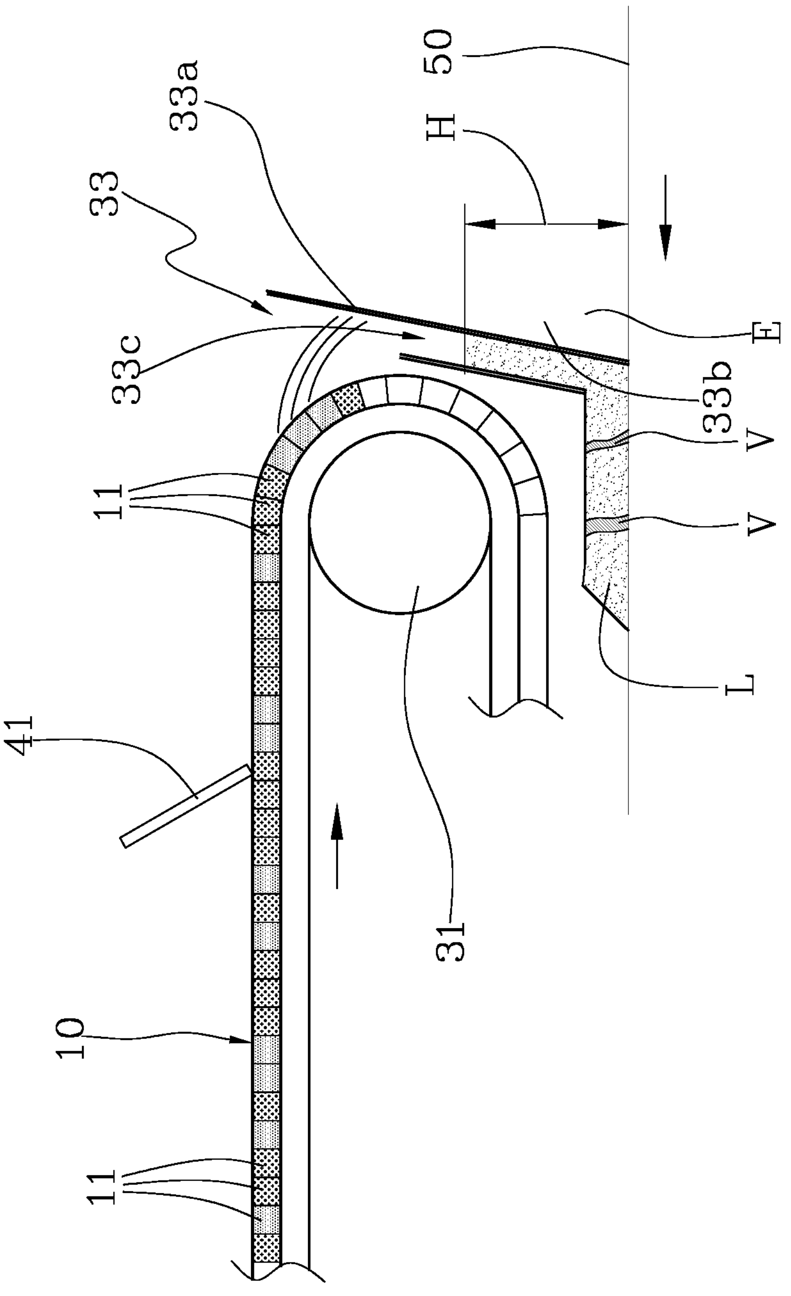
FIG. 6*b* shows an alternative embodiment of the detail "33" of FIG. 6*a;*
Figure 7:
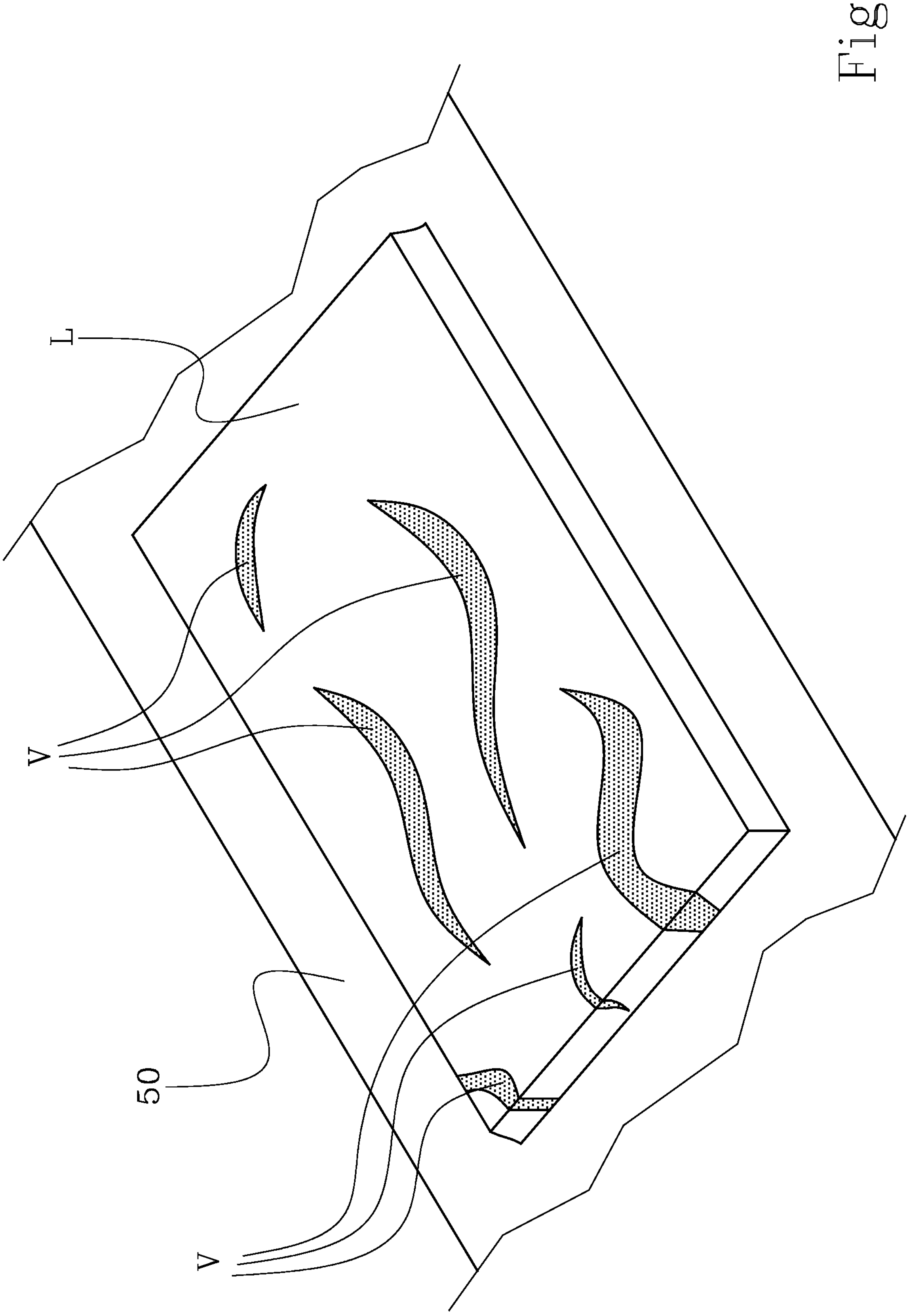
FIG. 7 shows a soft layer decorated with the method according to the present invention.

In a first preferred, but non-exclusive embodiment, the cavities (11) comprise a plurality of elongate grooves, parallel to one another, as schematically illustrated in FIGS. 3*a*, 3*b*, 5*b*. The elongate grooves have a closed bottom and are laterally delimited by two walls, which can be parallel or inclined relative to each other and convergent towards the bottom. In a possible embodiment, the elongate grooves have a V-shaped section on a transversal plane. The cavities (11) are preferably adjacent to one another.

In this first embodiment, the cavities (11) can be disposed parallel to the longitudinal direction (Y) of forward travel, or else they can be inclined relative to the longitudinal direction (Y) on the same plane as the latter. Preferably, but not necessarily, the cavities (11) are all in the form of elongate grooves. Furthermore, the cavities (11) occupy the entire surface of the decoration surface (10). This favours filling of the cavities (11) themselves.

In a second possible embodiment, the cavities (11) have a rhomboidal contour, but other shapes are obviously possible. The rhomboidal shape of the cavities ensures a better continuity of resting contact with a blade (41), which will be described subsequently.

The decoration surface (10) can be made in the form of a flat element, in whose thickness the cavities (11) are formed. Alternatively, the cavities (11) can be structured in such a manner as to be able to be applied on the decoration surface (10). In a possible embodiment, the decoration surface (10) comprises a layer of flexible material, for example a rubber or plastic material, in whose thickness the cavities (11) are formed. In a particularly advantageous embodiment, the decoration surface (10) comprises a flexible belt in which the cavities (11) are formed and open out onto the surface of the belt itself. For example, the cavities (11) can be formed by engraving or by impression on the surface of the flexible belt.

Preferably, but not necessarily, the cavities (11) are identical to one another and are distributed over the decoration surface (10) in a regular manner. The cavities (11) are adjacent to one another along their sides, so as to be separated by a relatively thin edge. In other words, each of the cavities (11) defines a volume suitable for receiving a pre-fixed amount of powder material for the decoration to be produced. Each cavity (11) can be filled independently of the others.

The machine according to the present invention further comprises a dispensing device (20), configured to deposit a pre-fixed amount of powder material inside one or more pre-established cavities (11). The dispensing device (20) comprises, for example, a hopper, provided with a discharge opening. The discharge opening comprises, for example, a discharge nozzle or conduit.

The dispensing device (20) can be allowed the possibility of moving relative to the cavities (11), i.e. relative to the decoration surface (10). In particular, the dispensing device (20) and/or the discharge opening of the dispensing device (20) are capable of moving so as to be able to dispense the powder material into any one of the cavities (11). Preferably, but not necessarily, both the cavities (11), by means of the decoration surface (10), and the dispensing device (20) are allowed the possibility of translating along at least one direction of movement. In the embodiment represented, the cavities (11) are mobile, by means of the decoration surface (10), along a longitudinal direction (Y), whereas the dispensing device (20) and/or the discharge opening are mobile along a transversal direction (X), perpendicular to the longitudinal direction (Y). In the example represented, both directions (X,Y) are horizontal.

The dispensing device (20) could be provided with one or more dispensing elements, each of which is configured to dispense the powder material into one or more cavities (11) selected in advance. As already mentioned, the dispensing device (20) could be in the form of a hopper provided with a bottom opening disposed transversely to the longitudinal direction (Y) for the entire width of the decoration surface (10), i.e. for the entire extent of the decoration surface (10) measured parallel to the transversal direction (X). In this manner, the dispensing device (20) is able to deposit material on an area of the decoration surface (10) that is parallel to the transversal direction (X).

Each dispensing element (20) could further be mobile in the ways described above, or else be translatable along the transversal direction (X) and/or along the longitudinal direction (Y).

The machine according to the present invention further comprises an unloading device (30), configured to move the cavities (11) from a loading position, in which they can receive the powder material from the dispensing device (20), to an unloading position, in which they can unload the powder material.

In a particularly advantageous embodiment, the unloading device (30) is structured so as to move the cavities (11) between a loading position, in which they are turned upward so as to receive the powder material from the dispensing device (20), and an unloading position, in which they are turned at least partially downward so as to unload the powder material downward substantially by gravity.

In the embodiment wherein the decoration surface (10) is flexible, the unloading device (30) comprises at least one rotating roller (31), around which the decoration surface (10) is at least partially wrapped. The roller (31) carries the decoration surface (10) in rotation so as to progressively move the cavities (11) from the loading position to the unloading position. In a possible embodiment, the decoration surface (10) thus takes on a cylindrical shape. During the rotation of the roller (31), the cavities (11) travel along a circumference along which, at least for a portion thereof, they are turned upward in the loading position, and for at least another portion thereof they are turned downward, in the unloading position. The dispensing device can be situated above the decoration surface (10), in order to unload the powder material towards the cavities (11) in the area in which the latter are turned upward in the loading position. In this embodiment, the cavities (11) could be formed on the surface of the roller (31), which would substantially take on the function of the decoration surface (10).

In the preferred, but non-exclusive embodiment illustrated, the decoration surface (10) is in the form of a flexible belt. The unloading device (30) comprises a pair of rollers (31,32), around which the decoration surface (10) is wrapped, so as to define a closed loop path. The cavities (11) are turned towards the outside of said closed path.

Along the path defined by the rollers (31,32), the decoration surface (10) has an upper portion (10*a*), along which it slides forward along the longitudinal direction (Y) and along which the cavities (11) are turned upward, in the loading position. The dispensing device (20) can be situated above the decoration surface (10), i.e. above the upper portion of the decoration surface (10), so as to able to unload the powder material downward and towards the cavities (11).

The loading of the cavities (11) can take place by combining a forward motion of the decoration surface (10) along a longitudinal direction (Y) with a shifting motion of the dispensing device (20) along a transversal direction (X), perpendicular to the longitudinal direction (Y), as already pointed out previously. Essentially, while the decoration surface (10) moves forward, the dispensing device (20), by means of its discharge opening, delivers the powder material to the cavities (11) in a selective and targeted manner, if necessary by translating along the transversal direction (X). This enables the powder material, contained in the dispensing device, to be delivered towards pre-established cavities (11), and not towards others. Downstream of the dispensing device (20) there can be provided a filling device (40), provided with a discharge opening disposed in such a way as to fill up the cavities (11) that were not filled by the dispensing device (20). The filling device (40) contains a second powder material which can be different from the one dispensed by the dispensing device (20), for example in terms of colour, particle size or other characteristics. The second powder material, unloaded by the filling device (40), fills up the cavities (11) that have remained empty or partially empty downstream of the dispensing device (20), and covers the cavities (11) already filled up by the dispensing device (20). A blade (41) is disposed in contact with the upper portion of the decoration surface (10), downstream of the filling device (40), so as to remove the powder material that exceeds the depth or height of the cavities (11), and thus projects from the upper surface of the decoration surface (11). In this manner, downstream of the blade (41), some cavities (11) are filled up with the first powder material unloaded by the dispensing device (20), other cavities (11) are filled up with the second powder material dispensed by the filling device (40), and still other cavities (11) can be filled with both the first and second powder materials. The two powder materials can thus be deposited in the cavities (11) in such a way as to define a decorative pattern that extends overall for the entire height of the cavities (11), i.e. it can extend from the bottom to the top of each cavity (11). The decorative pattern is discretised, i.e. broken down in the mutually adjacent cavities (11) which maintain the conformation thereof stable. This is because each cavity (11) contains a pre-fixed amount of powder material, and prevents this amount from being able to mix with the adjacent powder material. The above-described filling of the cavities (11) can also be obtained using a dispensing device (20) provided with one or more dispensing elements, each intended to dispense a different powder material into one or more cavities (11) selected in advance. For example, said dispensing elements can be placed consecutively to one another above the upper portion of the decoration surface (10). This enables particularly variegated and elaborate decorative patterns to be created.

The filling of the cavities (11) can take place by combining a forward motion along the longitudinal direction (Y) of the decoration surface (10) with a motion along the transversal direction (X) of the dispensing device (20) and/or dispensing elements. Alternatively, the decoration surface (10) could be kept stationary, and the dispensing device (20), comprising any dispensing elements, could be mobile both along the longitudinal direction (Y) and along the transversal direction (X).

As already indicated, the rollers (31,32) carry the decoration surface (10) slidingly along a closed path in such a way as to progressively move the cavities (11) from the loading position to the unloading position. In the passage from the loading position to the unloading position, the cavities (11) pass from a position in which they are turned upward to a position in which they are turned downward. During this passage, each cavity (11) can pour its contents downward. As schematically shown in FIGS. 3*a*,3*b*,6*a*,6*b*, the passage of the cavities (11) from the loading position to the unloading position takes place progressively along the portion of the decoration surface (10) that revolves around a first roller (31). When each cavity (11) is turned downward, i.e. after having passed entirely over the first roller (31), the pouring of the contents is substantially complete. By revolving around the second roller (32), the cavities (11) bring themselves back into the loading position, so as to receive a new load of powder material.

In a possible embodiment, not illustrated, the unloading device (30) could be positioned in such a way as to unload the powder material contained in the cavities (11) directly into the mould of a press.

In the solution represented, the first deposition surface (50) is situated below the decoration surface (10), so as to receive the powder material unloaded from the cavities (11). Between the decoration surface (10) and the first deposition surface (50) there is provided a relative motion, directed along the longitudinal direction (Y), which takes place simultaneously with the unloading of the powder material from the cavities (11). This enables the powder material unloaded from the cavities (11) to be deposited in a continuous layer (L) on the first deposition surface (50).

The relative motion between the first deposition surface (50) and the decoration surface (10) can be obtained, for example, by keeping the first deposition surface (50) stationary and translating the decoration surface (10), integrally with the unloading device (30), along the longitudinal direction (Y), i.e. by translating the rollers (31,32) and the decoration surface (10) associated therewith along the longitudinal direction (Y).

In a preferred embodiment, the relative motion between the first deposition surface (50) and the decoration surface (10) is obtained by sliding the first deposition surface (50) along the longitudinal direction (Y), while the decoration surface (10), despite being slidable along its path around the rollers (31,32), is static on the whole along the direction (Y). The sliding of the first deposition surface (50) can be in the same direction as or opposite to the sliding of the upper portion of the decoration surface (10) in its motion around the rollers (31,32). Preferably, but not necessarily, the first deposition surface (50) is in the form of a mobile belt sliding along a closed path defined by two or more rollers, as shown in FIG. 1.

In the embodiment represented, the powder material is unloaded from the cavities (11) and deposited on the underlying first deposition surface (50). As already indicated, the unloading of the cavities (11) takes place by means of the sliding of the decoration surface (10), in the portion in which the decoration surface (10) revolves around the first roller (31). Along said portion, the cavities (11) in fact pass from the loading position, in which they are turned with their opening facing upward, to the unloading position, by turning their opening progressively downward and, simultaneously, unloading their content of powder material downward.

The relative motion between the first deposition surface (50) and the decoration surface (10) results in the ceramic material being deposited in a continuous layer (L). By adjusting the relative speed between the first deposition surface (50) and the decoration surface (10) it is possible to adjust the thickness or height of the layer that is formed on the first deposition surface (50). In the embodiment represented, wherein the unloading device (30) is stationary, this variation can be obtained by varying the sliding speed of the first deposition surface (50) and/or the sliding speed of the decoration surface (10). Increasing the relative speed decreases the thickness of the layer that is deposited on the first deposition surface (50), while reducing the relative speed increases the thickness of the layer.

In a possible embodiment of the machine, a control processor is set up to control the dispensing device (20) in such a way as to fill the cavities (11) in relation to the decoration (V) it is intended to produce in the layer (L1). To this end, the control processor is provided with an algorithm that makes it possible to process an image of the decoration (V) so as to break it down into a series of volumes of powder material, of a pre-fixed colour, each of which is attributed to a pre-fixed cavity (11). The control processor thus regulates the operation of the dispensing device (20) in such a way that each volume is introduced into a pre-fixed cavity (11). The correspondence between each volume and a respective cavity is established by making known to the control processor the position of each cavity (11), the speed of the decoration surface (10) and the speed of the first deposition surface (50), for example by means of an encoder, sensors or optical systems that are known in the art. Essentially, based on the decoration (V) it is intended to produce, the control processor defines the number and position of the volumes of material necessary to obtain it, and attributes each volume to a cavity (11), in relation to the position in which the volume contained in the cavity (11) will be unloaded on the first deposition surface (50).

In a preferred embodiment of the machine, the sliding of the first deposition surface (50) is opposite to the sliding of the upper portion of the decoration surface (10) in its motion around the rollers (31,32). This enables the first deposition surface (50) to be disposed below the unloading device (30) in such a way as to contain the overall dimensions of the machine along the longitudinal direction (Y). Essentially, it is sufficient that an end portion of the first deposition surface (50) projects beyond the front end of the decoration surface (10), so as to enable the deposition of the layer (L), while the remaining part of the first deposition surface (50) extends below the unloading device (30).

In order to improve the deposition of the material on the first deposition surface (50), so as to preserve the decoration distributed in the cavities (11) by means of the dispensing device (20), it is preferable to reduce the distance between the upper portion of the decoration surface (10) and the first deposition surface (50) to a minimum. For example, the distance between the upper portion of the decoration surface (10) and the first deposition surface (50) can be reduced by providing a first roller (31) of a reduced diameter.

In order to favour the maintenance of the structure of the decoration, it is possible to provide a containment barrier (33), disposed and shaped in such a way as to intercept the material that is unloaded from the cavities (11), so as to guide or divert its trajectory in a pre-established manner.

In the embodiments represented, the barrier (33) is disposed in proximity to the first roller (31), i.e. in proximity to the area in which the unloading of the cavities (11) takes place.

In the embodiment represented in 3*b* and 6*b*, the barrier (33) comprises a pair of walls (33*a*, 33*b*) set side by side so as to define a collection space (33*c*). Preferably, but not necessarily, the collection space (33*c*) is further delimited by two further transversal walls, not represented, which join the walls (33*a*,33*b*).

A first wall (33*a*) is situated in proximity to the first roller (31), i.e. in proximity to the area in which the unloading of the cavities (11) takes place. As in the case of the barrier (33), the first wall (33*a*) is disposed and shaped in such a way as to intercept the material that is unloaded from the cavities (11), so as to guide or divert its trajectory inside the collection space (33*c*). The second wall (33*b*) is situated upstream of the first wall (33*a*) relative to the direction of forward travel of the cavities (11). The second wall (33*b*) is placed in such a way as not to interfere with the material that is projected forward by the cavities (11), but rather to contain the material intercepted by the first wall (33*a*), which falls downward. For this purpose, the second wall (33*b*) has an upper edge situated at a lower height relative to the trajectory followed by the material unloaded from the cavities (11). For example, the upper edge of the second wall (33*b*) is situated below the horizontal diametral plane of the first roller (31).

The two walls (33*a*,33*b*) preferably have an inclination that is close to the vertical, in order to limit the internal sliding of the material.

Essentially, in the embodiment represented, the two walls (33*a*,33*b*) define a hopper that collects the material coming from the cavities (11) and deposits it on the deposition surface (50).

The first wall (33*a*) has a lower edge (E) that is raised by a certain height relative to the deposition surface (50). The material accumulated inside the collection space (33*c*) is progressively deposited on the deposition surface (50) and is drawn forward by the latter, passing below the lower edge (E), which also enables the upper surface of the continuous layer (L) to be levelled. The second wall (33*b*) preferably has a lower edge close to the deposition surface (50), at a height such as to prevent any passage of material. By accumulating inside the collection space (33) and being progressively unloaded on the deposition surface (50), the material maintains the decoration (V) it is intended to produce in the layer (L).

The forward travel speed of the deposition surface (50) and the forward travel speed of the support element (10) are adjusted in such a way that the amount of material accumulated in the collection space (33*c*) remains substantially constant. This makes it possible to control the structure of the decoration (V) with great precision, and to transfer the decoration (V) with the expected configuration and definition on the deposition surface (50). The forward travel speed of the deposition surface (50) and the forward travel speed of the support element (10) are preferably adjusted in such a way that the height (h), measured relative to the deposition surface (50), of the material inside the collection space (33*c*) remains substantially constant. In addition to the advantages indicated above, maintaining a constant height (h) makes it possible to reduce the drop of the material from the support element (10) downward. The material, in fact, does not fall from the support element (10) to the deposition surface (50), but rather undergoes a smaller drop, from the support element (10) to the height (h) in the collection volume (33*c*).

In the embodiment represented in 3*a* and 6*a*, the barrier (33) has a curved shape and is set alongside the first roller (31). The barrier (33) extends for a pre-established arc, up to an area from which it is desired that the unloading of the material towards the first deposition surface (50) takes place.

In both solutions, the second layer (L2) is transferred from the first deposition surface (50) to the second deposition surface (83) starting from the tail (T). This entails a correction or modification of the inclination of the decoration (V) in the third layer (L3).

In the former case, the decoration (V) in liquid form is applied while the decoration surface (10) is in motion from right to left, or from left to right, with reference to FIG. 2. In the latter case, the first layer (L1) is spread on the decoration surface (10) comprising the cavities (11), in motion from right to left, or from left to right, with reference to FIG. 4.

In both cases, following the application of the decoration (V), the first layer (L1) is transferred from the decoration surface (10) to the first deposition surface (50), thus forming the second layer (L2) starting from the head (H) and ending with the tail (T). In the solution represented, this transfer is carried out while the first deposition surface (50) is in motion from right to left. Once the deposition of the second layer (L2) has been completed, the motion of the first deposition surface (50) is reversed and the second decorated layer (L2) is transferred to the second deposition surface (83), which moves in the same direction as the first deposition surface (50). In this manner, the tail (T) of the second layer (L2) will be the first part to be transferred and deposited on the second deposition surface (83).

As shown in FIGS. 2 and 4, the second deposition surface (83) can be used to convey the decorated soft layer (L3) to a press (80). For example, the press (80) is in the form of a belt press, known in the art for pressing large-sized slabs. A press of this type comprises a lower die (81), provided with a pressing surface facing upward. An upper die (82), provided with a pressing surface facing downward, is situated above the lower die. At least one of the two dies is movable towards and away from the other in order to carry out pressing of a layer (L3) of ceramic material in powder form. The press further comprises a mobile surface (83), in the form of a flexible belt, that has an active portion (84) disposed at least partially between the upper die (82) and the lower die (81). The press also comprises a second mobile surface (85), in the form of a flexible belt, that has an active portion (86) disposed between the active portion (84) of the first mobile belt (83) and the upper die (82). Following pressing, the slabs can be delivered to a kiln for the firing step.

The invention claimed is:

1. A method for decorating in thickness a ceramic slab, comprising the following steps:

preparing, on a decoration surface, a first soft decorated layer of ceramic material endowed with a decoration;

progressively transferring, by deposition, the soft decorated layer from the decoration surface to a first deposition surface, situated at a lower height than the decoration surface, thus progressively forming on the first deposition surface a second soft decorated layer which has a head and a tail, the head being formed by the ceramic material that is deposited first on the first deposition surface, the tail being formed by the ceramic material that is deposited last on the first deposition surface;

progressively transferring, by deposition, the second soft decorated layer from the first deposition surface to a second deposition surface, situated at a lower height than the first deposition surface, starting from the tail of the second soft decorated layer, thus progressively forming on the second deposition surface a third soft decorated layer.

2. The method according to claim 1, wherein the step of preparing the first soft decorated layer of ceramic material comprises the following steps:

spreading a soft layer of granular or powder material on the decoration surface;

applying a liquid decoration on top of the soft layer.

3. The method according to claim 1, wherein the step of preparing the first soft decorated layer of ceramic material comprises the following steps:

preparing the decoration surface, provided with a plurality of cavities with a pre-established shape;

filling up the cavities with two or more ceramic materials in powder or granular form, applied in succession.

4. The method according to claim 1, wherein the first deposition surface is mobile along the longitudinal direction.

5. The method according to claim 1, wherein the second deposition surface is mobile along the longitudinal direction.

6. A device for the decoration in thickness of a ceramic slab, comprising:

a decorator device, provided to prepare a first soft decorated layer of ceramic material endowed with a decoration on a decoration surface, situated below the decorator device;

a first deposition surface, situated at a lower height than the decoration surface;

a second deposition surface, situated at a lower height than the first deposition surface;

a first motor means, configured to provide a relative motion, directed along a longitudinal direction, between the decoration surface and the first deposition surface said first motor means being provided to slide the first deposition surface along the longitudinal direction, while the decoration surface, being slidable along its path around rollers, is static on the whole along the longitudinal direction, said first motor means being provided to transfer the soft decorated layer from the decoration surface to the first deposition surface, progressively forming on the first deposition surface a second soft decorated layer which has a head and a tail, the head being formed by the material that is deposited first on the first deposition surface, the tail being formed by the material that is deposited last on the first deposition surface;

a second motor means, configured to provide a second relative motion, directed along the longitudinal direction, between the first deposition surface and the second deposition surface;

wherein the first motor means and the second motor means can be activated independently of each other;

characterized in that:

said first motor means are configured to reverse the motion of the first deposition surface, such that a second decorated layer is transferred to the second deposition surface, which moves in the same direction as the first deposition surface, the tail of the second layer being the first part to be transferred and deposited on the second deposition surface.

7. The device according to claim 6, wherein the decorator device is an ink-jet printer or a device capable of emitting a liquid.

8. The device according to claim 6, wherein the decorator device comprises:

a decoration surface, provided with one or more cavities with a pre-established shape;

a dispensing device, configured to deposit a pre-fixed amount of powder material inside the one or more cavities with the pre-established shape;

an unloading device, configured to move the cavities from a loading position, in which they can receive the powder material from the dispensing device, to an unloading position, in which they can unload the powder material.

9. The device according to claim 6, wherein the first deposition surface is mobile along the longitudinal direction.

10. The device according to claim 6, wherein the second deposition surface is mobile along the longitudinal direction.

* * * * *